Nov. 20, 1934.  P. H. CRAIG  1,981,583

METHOD OF PRESERVING FRUITS, VEGETABLES, ETC

Filed Oct. 17, 1929

Inventor
Palmer H. Craig
By Ralph B. Stewart
Attorney

Patented Nov. 20, 1934

1,981,583

UNITED STATES PATENT OFFICE

1,981,583

METHOD OF PRESERVING FRUITS, VEGETABLES, ETC.

Palmer H. Craig, Cincinnati, Ohio, assignor to Invex Corporation, a corporation of New York Application October 17, 1929, Serial No. 400,387

10 Claims. (Cl. 99—11)

My invention relates to a method of and apparatus for treating fruits, vegetables, and their products, with electric radiations. My invention is particularly useful in preserving fruits, vegetables, etc., although it may be adapted to other uses requiring the action of electric radiations of the type involved.

An object of my invention is to devise apparatus for preserving or treating food materials by electric radiations in which the primary source of energy is a source of "hard" X-rays. It has been found that hard X-rays of themselves are not sufficiently absorbed by the material being treated to effectively kill the micro-organisms which cause spoiling or fermentation. Accordingly, in my invention I employ the hard X-rays to act upon a radiator substance to produce secondary or fluorescent radiations of a type to produce the desired effect. These secondary radiations then act upon the substance under treatment to effectively kill the bacteria and prevent spoiling.

Apparatus for accomplishing the object of my invention is illustrated in the accompanying drawing in which.

Figure 1:
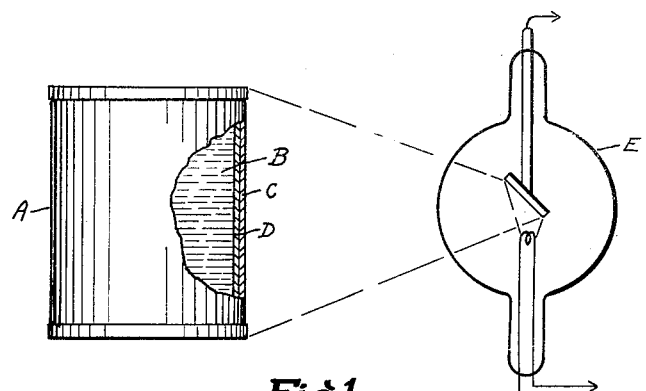
Figure 1 is a view, partly in section, illustrating one arrangement in which the substance to be preserved is subjected to the preserving treatment in the ultimate container in which it is sealed.

Referring to Figure 1: A indicates a container into which is sealed the substance B to be preserved, such as fruits, vegetables, or their products, such as fruit juices. The container A is preferably the ultimate container in which the substance is distributed and sold on the market, and may comprise a metallic casing C of any desired material having the proper strength and mechanical working characteristics, and a metallic coating D on the inside of the casing comprising a suitable metal which when subjected to the action of "hard" X-rays will emit secondary or fluorescent radiations, such as soft X-rays, photoelectrons, ultra-violet radiations, etc. The metal forming the casing C is preferably of a lower atomic number than the metal coating D in order to prevent undue absorption of the hard X-rays by the casing; for example, casing C may be of iron and coating D of tin. E indicates any suitable source of hard X-rays, such for example an ordinary X-ray tube.

In practicing my invention with the apparatus shown in Fig. 1, the hard X-rays from the source E pass through the casing C and are partially absorbed by the metallic coating D within the container A, and are there transformed into secondary radiations comprising soft X-rays, photoelectrons and ultraviolet radiations. These secondary radiations are effective in killing bacteria, yeast, mold, etc. which are responsible for the "spoiling" or fermentation of fruit or vegetable products. Provision may be made for rotating or agitating the container A while under the influence of the hard X-rays from the source E in order to insure proper treatment of all of the substance within the container. The length of time necessary to effectively sterilize or treat the material will depend upon the strength of the X-ray source and the distance of separation of the source from the container. The necessary time will vary from a few seconds to a few minutes. As the source of X-rays, I prefer to employ a Coolidge type water-cooled X-ray tube using applied voltages from 40 to 250 kilo-volts. Such a tube is usually provided with an anticathode of tungsten and, over the voltage range mentioned, produces primary or hard X-rays of maximum intensity ranging in wavelength from about 0.5 angstrom units for the low voltage values down to wavelengths of the order of 0.21 angstrom units for the high voltage values.

In the event that casing C is made of an oxidizable metal, such as iron, it may be found desirable to coat or plate the casing on the outside with a suitable coating to prevent rust. Such coating, if metallic, should preferably be of a metal having a lower atomic number than the metal forming the casing C, for example zinc. It is obvious that the container C may be formed of suitable metal for directly producing the desired secondary radiations, and the inner coating D may be dispensed with.

The character of the secondary radiations will depend upon the nature of the material employed as the secondary radiator. In general, materials of low atomic number will emit secondary radiations of long wave lengths, and vice versa. The soft X-rays produced by secondary radiation are sometimes referred to as "characteristic" radiations since their wavelengths depend upon the atomic structure of the radiator material.

These soft X-rays are known to include a number of waves which are grouped according to their wavelengths into several series known as the K, L and M series. The waves of K series have the shortest wavelength and, therefore, have the greatest penetrating power; they also are of greatest intensity. The wavelengths corresponding to the different series for any given element may be found in any standard textbooks on X-rays. Primary waves of a given wavelength cannot cause the emission of secondary waves of shorter wavelength from a body subjected to their influence. Accordingly, using primary X-rays as long as .5A as indicated above, the range of the more penetrating soft X-rays employed in practicing my invention would extend from about 0.5A to about 12A, where metallic radiators are employed; the upper limit being the wavelength of the K waves radiated by the metals of low atomic weight. The waves in the L and M series are of longer wavelengths and are of less intensity than the K series.

The ultra-violet radiations forming a part of the secondary radiation, being of a longer wavelength than the soft X-rays, will obviously have less penetrating power than the soft X-rays and any lethal action of such radiation will, therefore, be limited principally to short distances from the radiator material. Likewise, any lethal action of photo-electrons (which are not electromagnetic waves) will also be limited to very small distances from the radiator due to their low penetrating power. It is obvious, therefore, that of the various forms of radiations found in the secondary radiation, the soft X-rays are most effective in penetrating the food material and killing the bacteria or living organisms.

Figure 2:
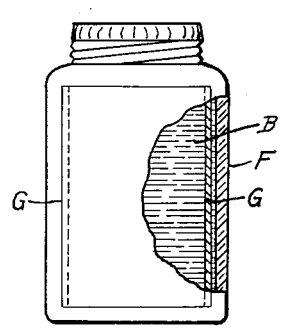
Figure 2 illustrates a second arrangement for treating the substance after it is sealed in its ultimate container.

In Fig. 2 the ultimate container F into which the substance to be preserved is sealed comprises an ordinary glass preserving jar. The substance B is sealed in the jar along with a metallic cylinder G which serves as a secondary radiator for emitting the secondary radiations when subjected to the action of the hard X-rays from source E. The radiator G may comprise a split metallic cylinder formed by rolling a sheet of suitable metal into cylindrical form and inserting it in the mouth of the jar. If desired, the cylinder may be perforated. Also, more than one cylinder of different diameters may be inserted in the jar.

The radiator G may be permanently sealed in the container along with the substance B, or it may be temporarily inserted into the container for the purpose of treating the substance and then removed before sealing the container.

Figure 2A:
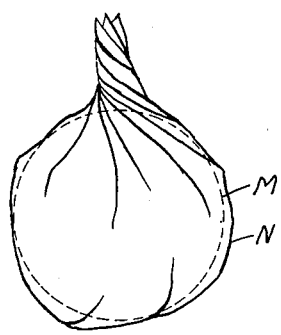
Figure 2a illustrates a third arrangement in which the substance to be treated is wrapped in a metallic foil.

In case of certain foods such as apples, oranges, etc., the irradiation by secondary emission may be accomplished by wrapping the food in foil, for example, tin foil, and then subjecting the wrapped food to the action of the hard X-rays. This method is illustrated in Figure 2a, in which the dotted line M indicates a piece of food, for example, an orange, (or vegetable) wrapped in a suitable metallic foil N. The food is preferably shipped and sold in the same foil wrapper which is employed for irradiation. Instead of using foil, the food may be wrapped in "Cellophane" or other suitable sheet material, or dipped in collodion, and then placed in or passed through a housing of suitable material such as tin for emitting secondary radiations while the housing is being subjected to the action of hard X-rays. The food is then taken from the housing and preferably shipped and sold in the same wrapper or covering employed for irradiating the substance.

Figure 3:
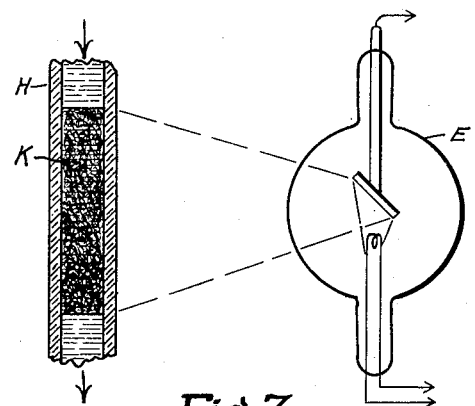
Figures 3 and 4 illustrate two forms of apparatus which may be employed for treating liquids before being placed in the ultimate container.

In Figure 3 I have shown an arrangement for the treatment of a continuous stream of liquid, such as fruit juices, pumped through a conduit H in which is located a secondary radiator K in the form of a filter element. The radiator K may comprise a porous mass, or "sponge," or net, or screen, of suitable metal such as tin or platinum. The radiator may also be formed of pieces of a suitable non-soluble mineral such as fluorite. The liquid in passing through the radiator K comes in intimate contact with the radiator and is thoroughly subjected to secondary radiations caused by the action of the hard X-rays from source E.

Figure 4:
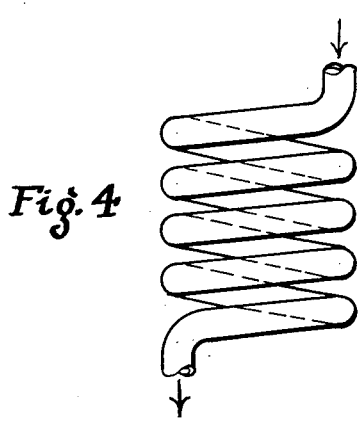

In Figure 4 I have illustrated a second form of apparatus for treating a continuous stream of liquid by passing the liquid through a hollow helix formed of suitable metal for producing the desired secondary radiations when subjected to the action of hard X-rays. In both the arrangement shown in Figs. 3 and 4, after treatment the liquid is conducted to suitable sterilized containers and sealed for distribution on the market.

While I have illustrated certain forms of apparatus which may be employed in practicing my invention, it is to be understood that the invention is not limited to the specific arrangement shown, but the apparatus may assume various forms by which the fruits, vegetables or liquids to be preserved are passed through, over, or around a material which emits secondary radiations under the influence of hard X-rays, and provision may be made for agitating the material under treatment in order to present all of it at some time to intimate contact with the source of secondary radiations. If desired, several sources of hard X-rays may be arranged around the material under treatment and operated simultaneously.

My invention may be employed for preserving uncooked and unsweetened fruits and vegetables either before or after they have been canned. Uncooked fruits and vegetables are desirable for their unimpaired vitamine contents, and the sugarless feature is one of economic importance.

While the principal action of the secondary radiations upon the material under treatment is to effectively prevent fermentation, etc., these radiations also serve to improve the food value of the material as is well understood in the art. In the appended claims, the term "food materials" is intended to cover any solid or liquid material which may be advantageously treated according to my invention.

Also, the terms "metallic radiator" and "metallic substance" are intended to cover materials in metallic form as distinguished from chemical compounds having a metal as a constituent element in non-metallic form.

I claim:

1. The method of preserving food materials which consists in sealing the material within a container having incorporated therein a substance capable of emitting secondary radiations including soft X-rays, and subjecting said radiator material to the action of hard X-rays to produce said secondary radiation, and subjecting said food material to said secondary radiations.

2. The method of preserving materials containing living organisms which consists in placing the material within a container formed of material substantially opaque to soft X-rays, incorporating within the container a radiator material capable of emitting soft X-rays, and subjecting said radiator material to the action of hard X-rays transmitted through said container to cause said radiator to emit soft X-rays, and subjecting said materials to said soft X-rays.

3. The method of treating materials which consists in wrapping the material in a metallic foil, irradiating said wrapped material with X-rays of a wavelength to cause said foil to emit secondary radiations including soft X-rays, and subjecting said material to said secondary radiations.

4. The method of treating materials which consists in wrapping the material in a metallic foil, and irradiating said wrapped material with X-rays having a wavelength shorter than the characteristic radiations of said metallic foil to produce a secondary radiation of soft X-rays from said foil, whereby said material is subjected to said soft X-rays.

5. The method of preserving food material which consists in sealing the material within an ultimate container having incorporated therein a metallic substance capable of emitting secondary radiations having high bactericidal action and greater penetrating power than ultra-violet radiations, and irradiating said container with hard X-rays to produce said secondary radiations and subjecting said food material to said secondary radiations.

6. The method of treating a material which consists in placing the material in a metallic container formed of a material capable of emitting soft X-rays, irradiating said container with hard X-rays, and subjecting said material to said soft X-rays.

7. The method of treating a material which consists in placing the material in a metallic container, irradiating said container with X-rays having a wavelength shorter than the characteristic radiations of said metallic container, and subjecting said material to said characteristic radiations.

8. The method of treating a material which consists in placing the material within a container, incorporating within the container a radiator material having an atomic number higher than the atomic number of the material of said container, and irradiating said radiator material with hard X-rays transmitted through said container to cause said radiator material to emit secondary radiations, whereby said material is subjected to said secondary radiations.

9. The method of treating materials with soft X-rays which consists in moving the material in a continuous stream past a radiator and in proximity thereto, and irradiating said radiator with X-rays of a wavelength to produce a secondary radiation of soft X-rays from said radiator, whereby the material is subjected to said soft X-rays as it passes said radiator.

10. The method of treating materials which consists in passing the material through a conduit formed of a substance capable of emitting soft X-rays by secondary radiation, and irradiating said conduit substance with X-rays of a wavelength to produce said secondary radiation, whereby said material is subjected to said soft X-rays in passing through said conduit.

PALMER H. CRAIG.